(12) United States Patent
Brault et al.

(10) Patent No.: US 9,796,264 B2
(45) Date of Patent: Oct. 24, 2017

(54) DRIVESHAFT FOR THE GEARBOX OF AUXILIARY MACHINES OF A TURBOJET ENGINE

(75) Inventors: Michel Gilbert Roland Brault, Quincy sous Senart (FR); Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 914 days.

(21) Appl. No.: 14/000,314

(22) PCT Filed: Feb. 17, 2012

(86) PCT No.: PCT/FR2012/050354
§ 371 (c)(1),
(2), (4) Date: Aug. 19, 2013

(87) PCT Pub. No.: WO2012/114029
PCT Pub. Date: Aug. 30, 2012

(65) Prior Publication Data
US 2013/0319140 A1 Dec. 5, 2013

(30) Foreign Application Priority Data
Feb. 21, 2011 (FR) ...................................... 11 51381

(51) Int. Cl.
*B60K 25/06* (2006.01)
*F02C 7/32* (2006.01)
(Continued)

(52) U.S. Cl.
CPC ................ *B60K 25/06* (2013.01); *F02C 7/32* (2013.01); *F02C 7/36* (2013.01); *F02K 3/06* (2013.01); *F05D 2220/50* (2013.01)

(58) Field of Classification Search
CPC ... B60K 25/06; F02C 7/32; F02C 7/36; F02K 3/06; F05D 2220/50; F01D 15/12; F01D 25/16
(Continued)

(56) References Cited

U.S. PATENT DOCUMENTS

2007/0240399 A1* 10/2007 Orlando .................... F02C 7/36
60/39.162
2008/0072568 A1* 3/2008 Moniz ....................... F02C 7/32
60/226.1
(Continued)

FOREIGN PATENT DOCUMENTS

| EP | 1 908 941 | 4/2008 |
|---|---|---|
| EP | 1 939 429 | 7/2008 |

(Continued)

OTHER PUBLICATIONS

International Search Report Issued Apr. 19, 2012 in PCT/FR2012/050354 Filed Feb. 17, 2012.

*Primary Examiner* — Mark Laurenzi
*Assistant Examiner* — Paul Thiede
(74) *Attorney, Agent, or Firm* — Oblon, McClelland, Maier & Neustadt, L.L.P.

(57) ABSTRACT

A turbojet engine including an intermediate casing including radial arms and a driveshaft for a gearbox for auxiliary machines of the turbojet engine, the driveshaft mounted in a radial arm, the radial arm including an intermediate bearing supporting the driveshaft, the intermediate bearing including plural rolling bearings supporting the driveshaft, the driveshaft including a first shaft element connected at one end to a mechanism providing mechanical transmission to an engine shaft of the turbojet engine, and a second shaft element connected at one end to a mechanism providing mechanical transmission to the box. The first shaft element and the second shaft element are linked by a connection (Continued)

including plural splines. A single plane transversely passes through the plural splines and the plural rolling bearings.

12 Claims, 4 Drawing Sheets

(51) Int. Cl.
  *F02C 7/36* (2006.01)
  *F02K 3/06* (2006.01)
(58) Field of Classification Search
  USPC .......................... 415/122.1, 124.2; 60/226.1
  See application file for complete search history.

(56) References Cited

U.S. PATENT DOCUMENTS

| 2008/0148881 | A1 | 6/2008 | Moniz et al. |
| 2009/0232640 | A1 | 9/2009 | Deperrois et al. |
| 2011/0221296 | A1* | 9/2011 | Vedy .................... H02K 1/2773 310/156.14 |

FOREIGN PATENT DOCUMENTS

| EP | 2 101 052 | 9/2009 |
| JP | 2001 317374 | 11/2001 |
| JP | 2003 269191 | 9/2003 |

* cited by examiner

DRIVESHAFT FOR THE GEARBOX OF AUXILIARY MACHINES OF A TURBOJET ENGINE

FIELD OF INVENTION

The present invention relates to the field of multi-spool and multi-flow aircraft turbojet engines. It is directed to a specific configuration of a driveshaft in a radial arm of an intermediate casing of such a turbojet engine.

BACKGROUND OF THE INVENTION

For driving auxiliary machines mounted on the turbojet engine, such as electric generators or oil or fuel pumps, which are required for operation of the turbojet engine or of the aircraft on which it is mounted, the required power is generally drawn from the main shaft. A twin-spool turbojet engine comprises two coaxial shafts: one, a low-pressure or LP shaft, connecting the low-pressure compressor to the low-pressure turbine, together forming the LP spool; the other, a high-pressure or HP shaft, connecting the high-pressure compressor to the high-pressure turbine, together forming the HP spool. In the case of such an engine, the power is generally transmitted to the auxiliaries by a radial arm, accommodated in an arm of the intermediate casing, one end of which comprises a conical pinion which interacts with a pinion rigidly connected to the high-pressure spool. The other end is mechanically connected to a box comprising a plurality of gears and forming a support for the auxiliary machines while also driving them. When the engine is a turbofan engine, the radial transmission shaft or driveshaft passes through the two streams, primary flow and secondary flow, because the gearbox for driving the accessories, also referred to as the AGB (Accessory Gear Box), is mounted on the casing of the fan generating the secondary flow.

A known driveshaft is formed of two elements known as the primary shaft and the secondary shaft. The first shaft element or primary shaft is connected at one of its ends to a means for providing mechanical transmission to an engine shaft of the turbojet engine. The second shaft element or secondary shaft is connected at one of its ends to a means for providing mechanical transmission to the gearbox for driving the accessories. An intermediate bearing for supporting the driveshaft can be provided in a portion of the radial arm. An intermediate bearing of this type generally comprises a plurality of rolling bearings for supporting the driveshaft when it is rotating.

In operation, the radial arm of the intermediate casing is subjected to aerodynamic forces. The deformations caused by these aerodynamic forces on the radial arm result in a first misalignment of the driveshaft in the region of the connection between the first shaft element and the second shaft element and a second misalignment of the driveshaft in the region of the intermediate bearing. These misalignments thus appear in different zones and produce an unbalance and vibrations of the driveshaft in the radial arm, resulting in particular in a moment in the region of the rolling bearings of the intermediate bearing, which reduces the driving efficiency of the shaft.

SUMMARY OF THE INVENTION

The object of the present invention is to overcome these drawbacks. It relates to a turbojet engine, in particular a multi-flow turbojet engine, comprising an intermediate casing having radial arms, and a driveshaft for a gearbox for auxiliary machines of the turbojet engine, mounted in a radial arm of the intermediate casing. The radial arm of the intermediate casing comprises an intermediate bearing for supporting the driveshaft. The intermediate bearing comprises a plurality of rolling bearings for supporting the driveshaft. The driveshaft comprises a first shaft element which is connected at one end to a means for providing mechanical transmission to an engine shaft of the turbojet engine, and a second shaft element which is connected at one end to a means for providing mechanical transmission to the gearbox for auxiliary machines. The first shaft element and the second shaft element are linked by a connection which consists in one end of the second shaft element being fitted in a hollow cylindrical end of the first shaft element and is provided by a plurality of complementary splines arranged on the first shaft element and on the second shaft element. The turbojet engine is noteworthy in that a single plane transversely passes through the plurality of splines and the plurality of rolling bearings. This makes it possible in particular to reduce the constraints in the intermediate bearing which are due to the misalignment of the two radial shaft elements and to reduce the play, in the region of the connection and in the region of the intermediate bearing, the connection which links the first shaft element and the second shaft element being articulated in a zone situated in the region of the rolling bearings of the intermediate bearing, which is the zone for supporting the shaft in the radial arm. This also facilitates the swiveling of the first shaft element and the second shaft element under the effect of the deflection in the radial arm of the intermediate casing. Thus, the positioning of the rolling bearings of the intermediate bearing in relation to the splines of the connection reduces the number of centres of gravity between the parts, and there is thus less misalignment between the first shaft element and the second shaft element.

According to one feature of the invention, the first shaft element and the second driveshaft element are articulated about a centre of swiveling and a single plane transversely passes through said centre of swiveling and the plurality of rolling bearings. This further facilitates the swiveling of the first shaft element and the second shaft element under the effect of the deflection in the radial arm of the intermediate casing. This makes it possible to reduce the unbalance and the vibrations of the driveshaft, given that the centre of swiveling of the driveshaft, situated in the region of the connection between the first shaft element and the second shaft element, and more particularly in the region of the splines of the connection, is brought back into the region of the intermediate bearing, that is to say into a swiveling plane of the driveshaft.

Advantageously, a single plane transversely passes through the centre of swiveling and the centre of each rolling bearing of the plurality of rolling bearings. This further facilitates the swiveling of the first shaft element and the second shaft element under the effect of the deflection in the radial arm of the intermediate casing. This makes it possible to reduce further the unbalance and the vibrations of the driveshaft, given that the centre of swiveling of the driveshaft, situated in the region of the connection between the first shaft element and the second shaft element, and more particularly in the region of the splines of the connection, is brought back into the region of a mid-plane passing through the centres of the rolling bearings of the intermediate bearing, that is to say the mid-plane of support for the driveshaft by the rolling bearings of the intermediate bearing.

According to one feature of the invention, a single plane transversely passes through the middle of each spline of the plurality of splines and the middle of each rolling bearing of the plurality of rolling bearings. This makes it possible to place the centre of swiveling of the connection, when this centre of swiveling is situated in a transverse plane comprising the middle of each spline, in the mid-plane of support for the driveshaft. The swiveling movement of the connection thus has its origin in the mid-plane of support for the driveshaft, and this makes it possible to reduce further the unbalance and the vibrations of the driveshaft, while increasing the swiveling range of the first shaft element in relation to the second shaft element, given that the centre of swiveling of the first shaft element in relation to the second shaft element is situated in the region of the splines.

Flexible swiveling of the driveshaft can also be obtained using rounded splines, thus increasing the swiveling scope of the first shaft element in relation to the second shaft element, while reducing, by the configuration according to the invention, the unbalance and the vibrations.

According to another feature of the invention, the first driveshaft element is accommodated in a first sleeve and the second driveshaft element is accommodated in a second sleeve.

This prevents lubrication oil of the intermediate bearing from filling the arm of the intermediate casing, and this also makes it possible to put the air/oil enclosure of the engine bearings in communication with that of the gearbox for the auxiliary machines.

According to another aspect of the invention, the intermediate bearing is accommodated in a space of the radial arm separating the primary flow and the secondary flow.

According to one feature of the invention, this further comprises a lubrication-oil injection device arranged to inject lubrication oil in the region of a plane transversely passing through the plurality of splines and the plurality of rolling bearings. This makes it possible to optimise the supply of oil, thus preventing the oil from producing an unbalance or a mass which would unbalance the shaft in its rotation, if it were transported in a conventional manner via the shafts.

According to another feature of the invention, the turbojet engine further comprises an outer race for the intermediate bearing, which race is centred in the casing. This improves the positioning of the shaft line while minimising the stacking-up of tolerances. This also makes it possible to close the oil enclosure formed by the casing and helps to seal it by compressing the seal mounted in the neck of the casing. This also makes it possible to centre and seal the secondary sleeve.

BRIEF DESCRIPTION OF THE DRAWINGS

A non-limiting embodiment of the invention will now be described with reference to the appended drawings, in which.

DETAILED DESCRIPTION

Figure 1:
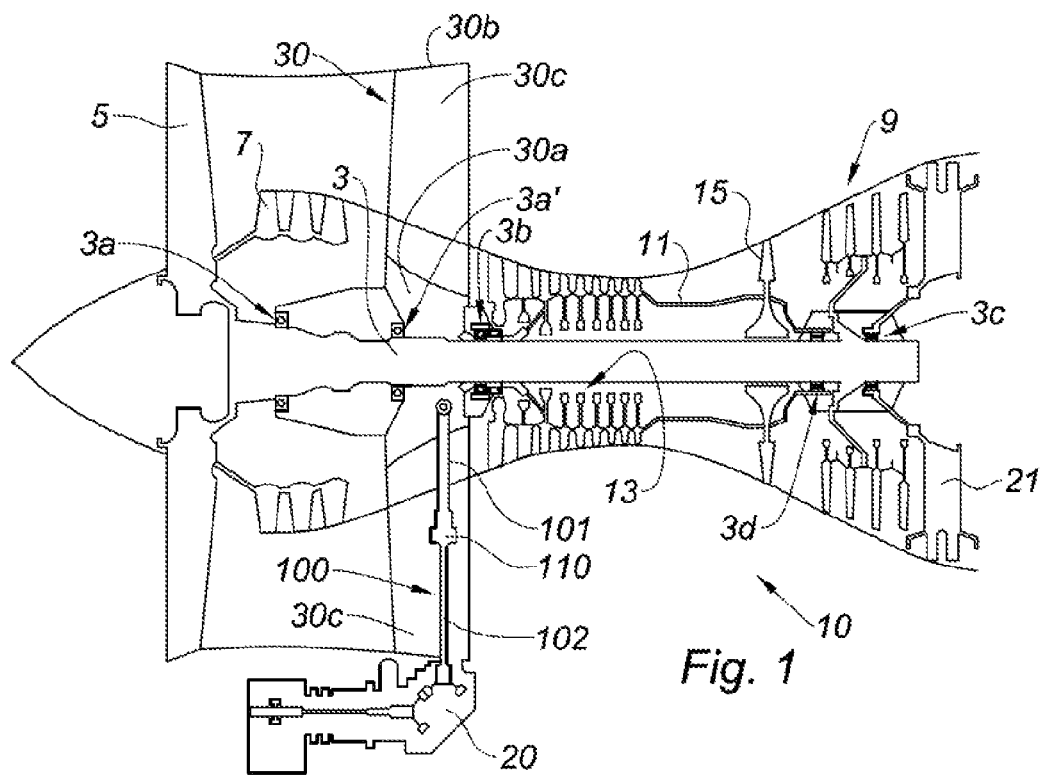
FIG. 1 is a general view in axial section of a twin-spool turbofan engine to which the invention can be applied.

FIG. 1 schematically shows a twin-spool turbofan engine 10 and the various main components thereof. Said engine comprises a first shaft 3 connecting, on the left-hand side in the figure, a fan rotor 5 and the first compressor stages 7 to the low-pressure turbine 9; the assembly forms the low-pressure or LP spool. Coaxial with the first shaft, a second shaft 11 in the form of a drum connects the high-pressure stages 13 of the compressor to the high-pressure turbine 15; the assembly forms the high-pressure or HP spool with the combustion chamber (not shown). The shaft 3 is supported upstream by the bearings 3a and 3a' mounted on the casing 30 which is referred to as the intermediate casing, and downstream by the bearing 3c mounted on the exhaust casing 21. The HP shaft is supported here by the bearing 3b of the intermediate casing 30 and at the rear of the shaft 3 via the inter-shaft bearing 3d.

Figure 2:
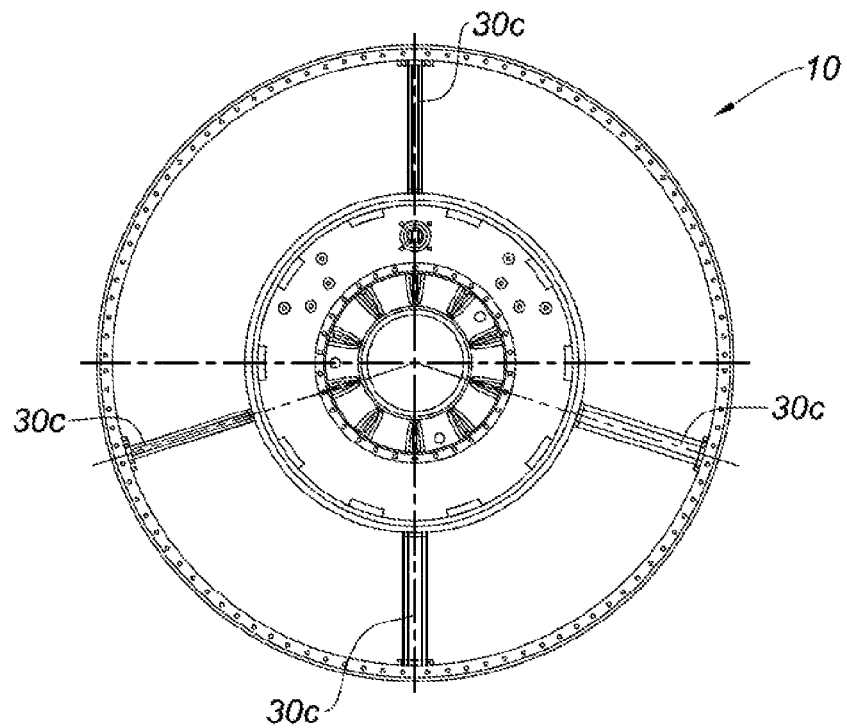
FIG. 2 is a rear view of a turbojet engine comprising an intermediate casing parallel thereto.
Figure 3:
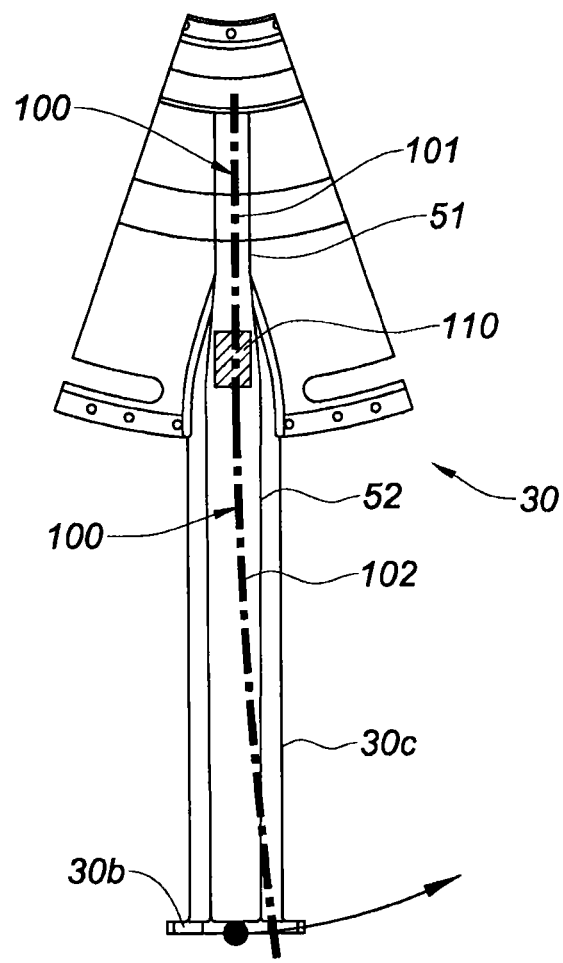
FIG. 3 is a schematic view of a radial arm of the intermediate casing in which a driveshaft is accommodated.

The intermediate casing 30 is made up of a hub 30a supporting the bearings 3a, 3a' and 3b, an outer shell 30b provided with means for forward fastening to the aircraft and supporting the fan casing, and radial arms 30c, shown in FIG. 2, connecting the hub 30a to the shell 30b. This intermediate casing 30 consists at least in part of a casting to which radial arms have optionally been attached. The auxiliary machines, such as generators and fuel or oil pumps, are mounted on a gearbox 20, as is known, which is referred to in the field as an AGB. This box is mounted on the outside of the fan casing in a position which allows access thereto for maintenance. The gears are mechanically connected to an engine shaft via a radial driveshaft 100, shown schematically in FIG. 3, which is accommodated in a radial arm 30c of the intermediate casing 30.

Figure 4:
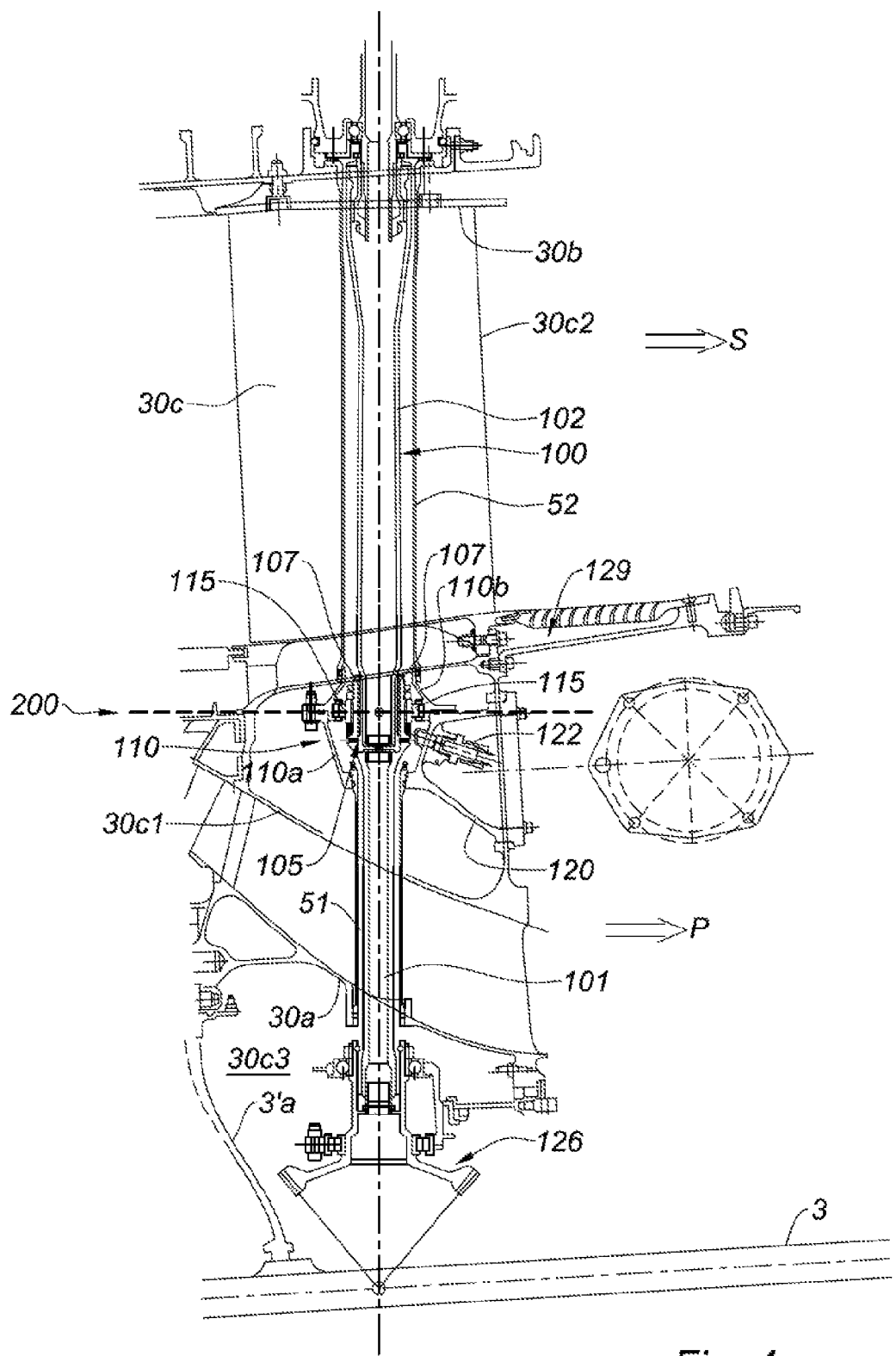
FIG. 4 is a sectional view of a radial arm of the intermediate casing in which a driveshaft of a turbojet engine according to the invention is accommodated.

The arm 30c is hollow and is formed of three radially separate portions, as shown in FIG. 4: 30c1, 30c2 and 30c3. The portion 30c3, which is aerodynamically profiled, passes through the stream of the primary flow P between the LP compressor and the HP compressor (not shown). The portion 30c3 of the arm 30c is adjacent to the hub 30a of the intermediate casing 30. The radial arm 30c comprises a portion 30c2 passing through the stream of the secondary flow S. The portion 30c2 is adjacent to the shell 30b. The arm 30c comprises a portion 30c1 between the first two portions. This portion defines a sector of annular space which on one side extends the splitter between the primary and secondary flows, and on the other side is itself extended by an annular space 129 between the two flows.

In operation, an engine of this type draws in air via the fan, which compresses it to form a primary flow which passes through the compression stages, the combustion chamber and the turbine stages, and a secondary flow which is discharged into the atmosphere, bypassing the combustion chamber. The turbines drive the compression means via the LP and HP shafts respectively.

As shown schematically in FIGS. 3 to 6, an intermediate bearing 110 makes it possible to support the driveshaft 100 between the ends connected respectively to the means for providing mechanical transmission to the engine shaft 3 of the turbojet engine 10 and to the means for providing mechanical transmission to the gearbox 20 for driving the accessories.

The bearing 110 comprises a casing 110a, a casing 110b and a plurality of rolling bearings 115. These rolling bearings 115 make it possible to support the driveshaft 100 and simultaneously promote the rotation thereof. These rolling bearings may be spherical rolling bearings known to a person skilled in the art.

As shown in FIGS. 3 to 6, the driveshaft 100 comprises a first shaft element or primary shaft 101. The first shaft element 101 is placed in a primary sleeve 51, connected to the casing 110a of the intermediate bearing 110 and accommodated in the radial arm 30c of the intermediate casing 30. This first shaft element 101 is connected to a first conical pinion at its inner radial end. This pinion is in engagement with a conical pinion rigidly connected to the HP spool.

The driveshaft 100 also comprises, as shown in FIGS. 3 to 6, a second shaft element or secondary shaft 102. The second shaft element 102 is placed in a secondary sleeve 52, connected by one end to the shell 30b and by the other end to the casing 110b of the intermediate bearing 110, and accommodated in the radial arm 30c of the intermediate casing 30. This second shaft element 102 is connected to a second pinion at its outer radial end which is in engagement with an input shaft of the gearbox 20.

Suitable seals ensure tightness between the intermediate casing 30 and the two sleeves 51 and 52. Similarly, seals are provided at the other two ends of the two sleeves 51 and 52. The shaft 100 passes through the shell 30b of the intermediate casing and its outer radial end is connected mechanically, for example by a splined connection, to a pair of conical pinions 126 shown in FIG. 4.

Figure 5:
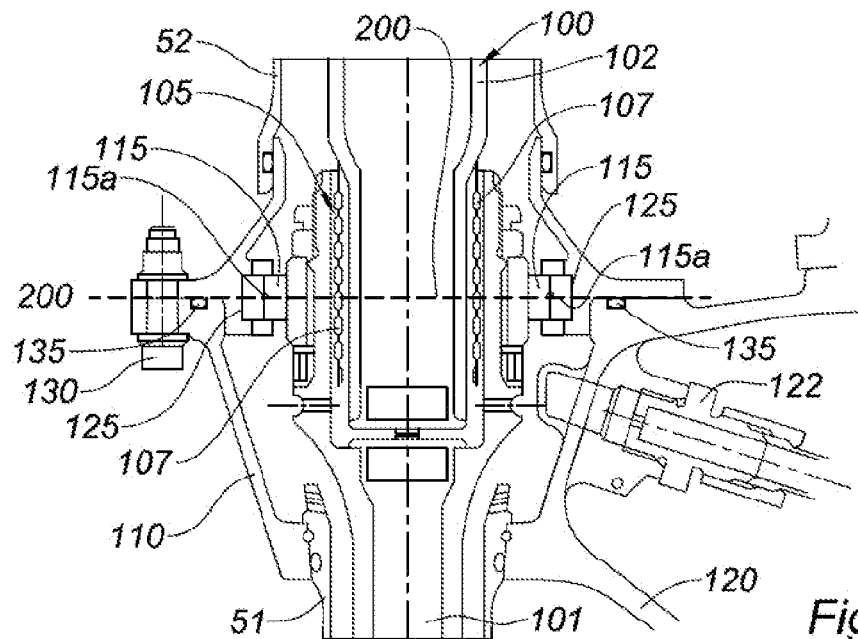
FIG. 5 is a sectional view of an intermediate bearing of a radial arm of the intermediate casing in which a driveshaft of a turbojet engine according to the invention is accommodated.
Figure 6:
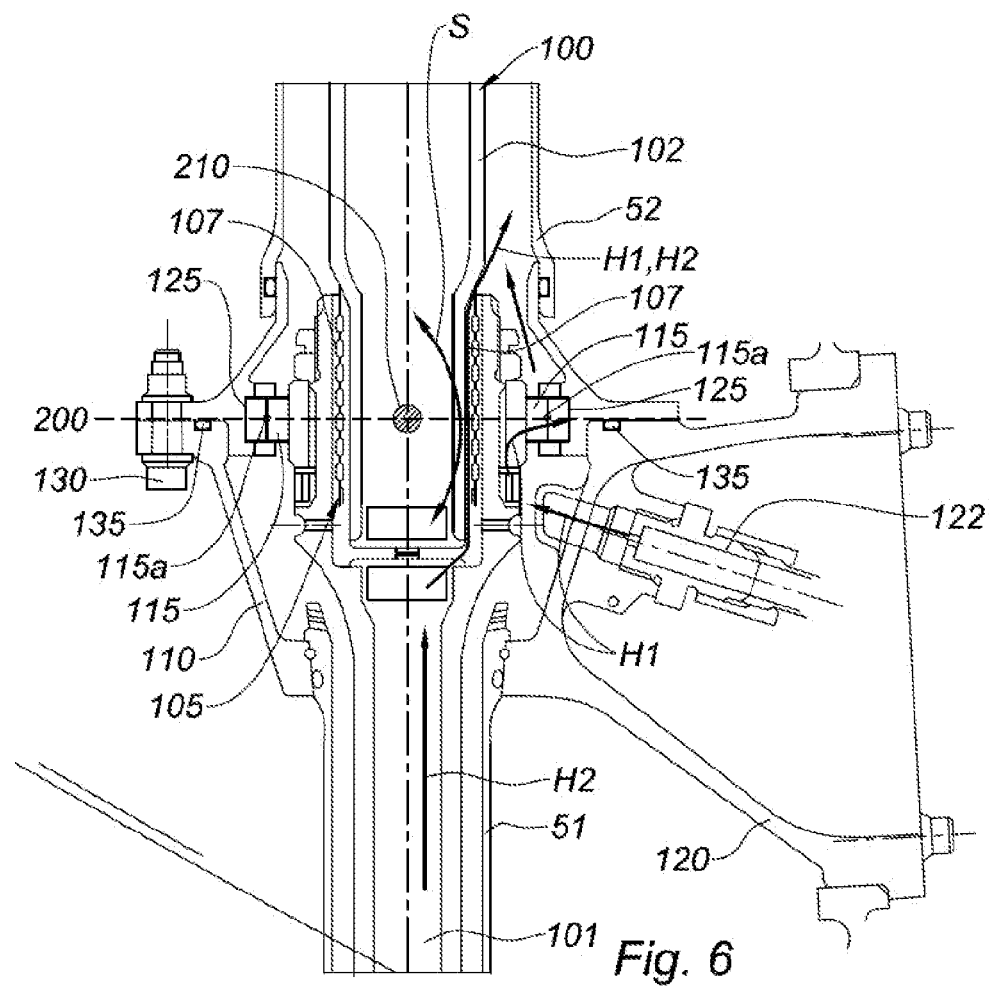
FIG. 6 is a schematic sectional view of an intermediate bearing of a radial arm of the intermediate casing in which a driveshaft is accommodated.

As illustrated in FIGS. 4 to 6, the first shaft element 101 and the second shaft element 102 of the driveshaft 100 are connected by a connection 105. The connection 105 consists in one end of the second shaft element 102 being fitted in a hollow cylindrical end of the first shaft element 101 and is provided by complementary splines 107 arranged on the first shaft element 101 and on the second shaft element 102. This plurality of complementary splines 107 thus makes it possible to nest the second shaft element 102 in the first shaft element 101 while connecting the first shaft element 101 and the second shaft element 102 for conjoint rotation.

At its lower end, the first shaft element 101 is connected by a splined connection to a pair of conical pinions 126 in engagement with a journal of the HP spool (not shown). The radial end of the second shaft element 102 is mechanically connected by a pair of conical pinions (not shown) to the input shaft of the gearbox 20. The rotational movement of the HP spool is thus transmitted to the input shaft of the gearbox 20 by the transmission means formed by the pair of conical pinions 126 and the driveshaft 100.

In the turbojet engine 10 according to the invention, a single plane transversely passes through the plurality of splines 107 and the plurality of rolling bearings 115. The articulation of the connection 105 is thus provided in the region of the support zone formed by the plurality of rolling bearings 115.

In the embodiment of the turbojet engine 10 according to the invention, the articulation of the connection 105, generated by the aerodynamic forces to which the turbojet engine 10 is subjected in operation, is provided, as shown in FIG. 6, about a centre of swiveling 210.

The embodiment illustrated in FIGS. 4 to 6 shows the case in which a single plane transversely passes through the centre of swiveling 210 and the plurality of rolling bearings 115, thus making it possible to centre the swiveling of the connection 105 in the region of the plurality of rolling bearings 115 and thus reduce the play of the driveshaft 100 in the radial arm 30c.

Likewise, in the embodiment illustrated in FIG. 6, a single plane 200 transversely passes through the centre 210 of swiveling S and the centre of each rolling bearing of the plurality of rolling bearings 115. This makes it possible to articulate the swiveling of the connection 105 in the mid-plane transverse to the rolling bearings 115, further reducing the play caused for example by the turbojet engine 10 in operation.

In the embodiment shown, a single plane transversely passes through the centre of each spline of the plurality of splines 107 and the centre of each rolling bearing of the plurality of rolling bearings 115. This corresponds to the specific case in which the centre 210 of swiveling S is in the transverse plane passing through the centre of each spline of the plurality of splines 107.

The splines 107 may be rounded to improve the swiveling S of the connection 105.

Lubrication is required in a driveshaft 100 of this type. The need for this oil-flow lubrication greatly exceeds the existing means for the driveshaft of the auxiliary machines.

The intermediate bearing 110 may thus comprise a casing 120 for transporting oil H1 required for the lubrication of the driveshaft 100 and the mechanical transmission elements via a circuit which does not interfere with the radial arms 30c of the intermediate casing 30. Oil H1 is transported by a specially dedicated device 122 installed in the casing 120, in order to inject the oil H1 directly into the region of the intermediate bearing 110 to lubricate it.

With the configuration of the splines 107 in relation to the rolling bearings 115 according to the invention, oil H2 can be transported directly into the region of the splines 107 and the rolling bearings 115, improving the efficiency of the rolling bearings 115 and thus the support, via the connection 105, of the driveshaft 100.

The outer race 125 for the intermediate bearing 110 is centred directly in the casing 120, thus improving the positioning of the shaft line while minimising the stacking-up of tolerances. The race is fixed to the box 120 by a plurality of bolts 130. The specific shape of the race makes it possible to close the oil enclosure formed by the casing 120, and helps to seal it by compressing the seal 135 installed in the neck of the casing 120. It also makes it possible to centre and seal the secondary sleeve 52. At the same time, the box 120 centres and seals the primary sleeve 51.

What is claimed is:

1. A multi-flow turbojet engine, comprising:
an intermediate casing including radial arms and a driveshaft for a gearbox for auxiliary machines of the turbojet engine,
the driveshaft being mounted in one of the radial arms of the intermediate casing,
the one of the radial arms of the intermediate casing comprising an intermediate bearing for supporting the driveshaft,
the intermediate bearing comprising a plurality of rolling bearings for supporting the driveshaft,
the driveshaft comprising a first shaft element including a first end which is connected to a means for providing mechanical transmission to an engine shaft of the turbojet engine and including a second hollow cylindrical end opposite to the first end, and a second shaft element including a first end which is connected to a means for providing mechanical transmission to the gearbox and including a second end opposite to the first end, the second hollow cylindrical end of the first shaft element and the second end of the second shaft element being linked by a connection in which the second end of the second shaft element is fitted in the second hollow cylindrical end of the first shaft element, said connection including a plurality of complementary splines arranged on the second hollow cylindrical end of the first shaft element and on the second end of the second shaft element, the complementary splines being surrounded by the plurality of rolling bearings, wherein a single plane, transverse to the plurality of complementary splines and to all the rolling bearings of the plurality of rolling bearings, passes through the plurality of complementary splines and all the rolling bearings of the plurality of rolling bearings.

2. The multi-flow turbojet engine according to claim 1, wherein the first shaft element and the second shaft element of the driveshaft are articulated about a center of swiveling, and wherein the single plane passes through the center of swiveling and all the rolling bearings of the plurality of rolling bearings.

3. The multi-flow turbojet engine according to claim 2, wherein the single plane transversely passes through the center of swiveling and a center of each rolling bearing of the plurality of rolling bearings.

4. The multi-flow turbojet engine according to claim 1, wherein the single plane transversely passes through a center of one of the complementary splines and a center of the plurality of rolling bearings.

5. The multi-flow turbojet engine according to claim 1, wherein each of the splines of the plurality of complementary splines is rounded.

6. The multi-flow turbojet engine according to claim 1, wherein the first shaft element of the driveshaft is accommodated in a first sleeve and the second shaft element of the driveshaft is accommodated in a second sleeve.

7. The multi-flow turbojet engine according to claim 1, wherein the intermediate bearing is accommodated in a space of the one of the radial arms separating a primary flow of the turbojet engine passing through compression stages, a combustion chamber, and turbine stages of the turbojet engine and a secondary flow bypassing the compression stages, combustion chamber, and turbine stages of the turbojet engine.

8. The multi-flow turbojet engine according to claim 1, further comprising a lubrication-oil injection device configured to inject lubrication oil in a region of the plurality of complementary splines and the plurality of rolling bearings.

9. The multi-flow turbojet engine according to claim 1, further comprising an outer race for the intermediate bearing that is centered in the intermediate casing.

10. The multi-flow turbojet engine according to claim 1, wherein the second end of the first shaft element is directly connected to the second end of the second shaft element.

11. The multi-flow turbojet engine according to claim 1, wherein the first shaft element is a single piece.

12. The multi-flow turbojet engine according to claim 1, wherein the second end of the first shaft element includes an internal radial shoulder against which the second end of the second shaft element abuts in a longitudinal direction of the second shaft element.

* * * * *